United States Patent
Wieland et al.

(10) Patent No.: US 8,527,150 B2
(45) Date of Patent: Sep. 3, 2013

(54) METHOD AND CONTROL DEVICE FOR TRIGGERING PASSENGER PROTECTION MEANS FOR A VEHICLE

(75) Inventors: Jochen Wieland, Renningen (DE); Stephan Rittler, Urbach (DE); Josef Kolatschek, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 307 days.

(21) Appl. No.: 12/735,332

(22) PCT Filed: Nov. 27, 2008

(86) PCT No.: PCT/EP2008/066332
§ 371 (c)(1),
(2), (4) Date: Oct. 8, 2010

(87) PCT Pub. No.: WO2009/092482
PCT Pub. Date: Jul. 30, 2009

(65) Prior Publication Data
US 2011/0046853 A1    Feb. 24, 2011

(30) Foreign Application Priority Data
Jan. 22, 2008 (DE) .................... 10 2008 005 526

(51) Int. Cl.
*B60R 22/00*    (2006.01)

(52) U.S. Cl.
USPC .............................. 701/45; 280/732; 180/370

(58) Field of Classification Search
USPC .................. 701/45; 280/732, 735; 180/270, 180/274; 340/436
See application file for complete search history.

(56) References Cited

U.S. PATENT DOCUMENTS

| | | | |
|---|---|---|---|
| 5,162,643 A * | 11/1992 | Currie | 250/206.1 |
| 7,107,144 B2 * | 9/2006 | Capozzi et al. | 701/117 |
| 7,542,836 B1 * | 6/2009 | Norton | 701/45 |
| 2004/0249561 A1 * | 12/2004 | Capozzi et al. | 701/117 |
| 2005/0269808 A1 * | 12/2005 | Song et al. | 280/732 |
| 2006/0250297 A1 * | 11/2006 | Prakah-Asante et al. | 342/70 |
| 2008/0100041 A1 * | 5/2008 | Kim et al. | 280/728.2 |
| 2009/0184495 A1 * | 7/2009 | Kim et al. | 280/728.2 |
| 2009/0292423 A1 * | 11/2009 | Norton | 701/45 |

FOREIGN PATENT DOCUMENTS

| | | |
|---|---|---|
| DE | 101 34 331 | 10/2002 |
| WO | WO 00/05597 | 2/2000 |

* cited by examiner

*Primary Examiner* — Helal A Algahaim
(74) *Attorney, Agent, or Firm* — Kenyon & Kenyon LLP

(57) ABSTRACT

A method and a control device for triggering passenger protection means for a vehicle, wherein the triggering takes place as a function of an analysis of at least one accident signal via a constant fraction discrimination method.

20 Claims, 5 Drawing Sheets

METHOD AND CONTROL DEVICE FOR TRIGGERING PASSENGER PROTECTION MEANS FOR A VEHICLE

BACKGROUND OF THE INVENTION

1. Field of the Invention

The present invention relates to a method and a control device for triggering passenger protection means for a vehicle.

2. Description of Related Art

The problem of differentiating types of impact at low driving speeds is known from published German patent document DE 101 34 331 C1. In particular, in a regulation, the U.S. NHTSA requires the so-called low-risk deployment, in which an impact against a rigid barrier as an obstacle is to be differentiated at 26 km/h and at 32 km/h. One design approach provided for this problem is to ascertain the impact speed by measuring a time difference between the start of impact and the time at which the acceleration transitions from a slight acceleration to a strong acceleration. These two impact types may then be differentiated in this manner.

SUMMARY OF THE INVENTION

The method according to the present invention and the control device according to the present invention for triggering passenger protection means for a vehicle have the advantage that a reliable design approach is found for distinguishing a 26 km/h frontal impact from a 32 km/h frontal impact. According to the present invention, the constant fraction discrimination method is used for this purpose.

It is advantageous that the point in time of the maximum of the acceleration signal may be ascertained almost independently of the signal amplitude. The constant fraction discrimination method is a method from electronic signal processing that allows for exact time markings to be assigned to wide pulses having varying signal strength at consistently constant rise times. However, the analysis of the accident signal via the constant fraction discrimination method may be used not only for acceleration signals, but also for signals derived from the acceleration signal or from other accident sensor signals. These signals include acceleration signals from acceleration sensors in different installation positions and different sensitivity directions. They also include the signals of air pressure sensors for side impact sensing from structure-borne noise sensors and also from environment sensors. Furthermore, in preferred designs, it is possible to use this method to distinguish crash types or crash severities of the most different types.

In the case at hand, triggering passenger protection means refers to the activation of these passenger protection means such as airbags, belt tighteners, crash-active headrests, or other passive passenger protection means, but also active passenger protection means, such as brakes or a vehicle dynamics control. The analysis of the at least one accident signal, for example, an acceleration signal or an integrated or double integrated acceleration signal, via the constant fraction discrimination method allows for the time markings in the accident signal to be ascertained. Consequently, points in time that are characteristic for the accident signal may be ascertained in a very reliable manner, so that the triggering that takes place as a function of this analysis becomes just as reliable. The constant fraction discrimination method is defined in one form in the dependent claims.

In the case at hand, a control device is an electric device that processes sensor signals and generates triggering signals for the passenger protection means as a function thereof. In particular, such a control device is a separate structural unit. However, it may also be disposed in company with other control devices within one housing.

The interface may take the form of hardware and/or software. In particular, the interface may be part of a system ASIC that includes many functions of the control device on one chip. This function includes the triggering circuit, for example; it is a logic circuit that processes the triggering signal and as a function thereof closes electrically controllable power switches in order to connect an ignition current to an ignition element of an airbag, for example, so that the ignition element is caused to ignite and the airbag is thus inflated. However, the triggering circuit may also exist as a separate structural unit, for example, as a separate ASIC or a combination of a plurality of electric and/or electronic modules. Furthermore, the evaluation circuit and the analysis module may take the form of hardware and/or software. A preferred design is a processor, for example, a microcontroller, that allows for the functions of the evaluation circuit, and in particular those of the analysis module, to be implemented in the software of this microcontroller. In addition to the analysis module, additional modules exist, for example, interface modules, in order to relay the triggering signal for the triggering circuit to the triggering circuit via an output in the evaluation circuit. The triggering signal may be transmitted as a software command, but also redundantly via hardware lines in order to ensure a reliable transmission of this triggering signal. This provides a particularly reliable transmission of this triggering signal.

Advantageous improvements of the method and control device for triggering passenger protection means for a vehicle recited in the independent claims are rendered possible by the measures and further refinements recited in the dependent claims.

It is advantageous that, as indicated above already, constant fraction discrimination methods are used, in particular for distinguishing between a 26 km/h and a 32 km/h frontal impact, the triggering of the passenger protection means being implemented only in the case of the 32 km/h frontal impact. The triggering occurs only if other conditions are also satisfied, such as a minimum weight of the respective vehicle occupant. This use demonstrates the efficiency of this method.

It is furthermore advantageous that the triggering takes place as a function of the analysis in conjunction with a check of the velocity of the vehicle itself and with a crash type recognition. That is, the analysis only results in triggering if the velocity of the vehicle itself and a crash type recognition also clear this triggering result. For example, the vehicle's own velocity may be checked to see whether it lies within a predefined velocity band. The crash type recognition may perform a check to see whether crash types are applicable in the present situation that necessitate a triggering of the passenger protection means.

Furthermore, it is advantageous that a first and a second component of the accident signal are used for the analysis of the at least one accident signal, and that the first component is delayed and the second component is inverted and evaluated, and that the components modified in this manner are added together again, the first zero crossing having a positive first derivation being detected as the crash time, and the triggering taking place as a function of this crash time. Thus, in the case at hand, the components are merely the accident signal itself, which is then delayed in one path and inverted and evaluated in the second path, that is, attenuated, for example. If these signals are added together again, then this signal displays a zero crossing having a positive first derivation at the maximum of the acceleration signal, for example. This results in the crash time, which is provided between this time marking and the exceeding of a noise threshold by the at least one accident signal, for example. This crash time then serves as an index, in order to distinguish the 26 km/h frontal impact from the 32 km/h frontal impact. The crash time is thus the time at which a first characteristic deformation event occurs, such as the increase of the deceleration as a result of the impact on the engine block in the event of a frontal crash, for example. This time is ascertained starting from the crash start, the crash start being defined by the fact that the acceleration signal exceeds a noise threshold of 3-6 g, for example. There are also other possibilities, however, for defining the crash start.

It is furthermore advantageous that the crash time is determined by a time period between an exceeding of a noise threshold by the at least one accident signal and the first zero crossing, as it was specified just now. However, in addition to the exceeding of the noise threshold, other criteria may also be used as the start of the time period.

The at least one accident signal is advantageously low-pass filtered and/or limited with regard to its rising edge prior to the analysis. This eliminates portions of the signal that may disturb the analysis. Thus, the method according to the present invention is designed to be more reliable.

As indicated above already, the analysis using the constant fraction discrimination method may be advantageously used to determine the crash type and/or the crash severity, in order to obtain an exact distinction between neighboring crash classes or crash types in this instance as well. A crash type is, for example, a frontal impact, an angle impact, an offset impact, a side impact, or a rollover event or a rear collision. The crash severity is the magnitude of the effect on the vehicle occupant, that is, the acceleration experienced by the vehicle occupant as a result of the accident.

Furthermore, it is advantageous that an acceleration signal and/or its first or second integral is used as the at least one accident signal. The first integral determines the velocity reduction, and the second integral determines the forward displacement of the vehicle occupant. The forward displacement is determined under the assumption that the occupant is idealized as a free-flying mass center.

Finally, it is also advantageous that for the at least one accident signal, a time-independent release threshold is used for a second airbag stage. For example, this allows for a time-independent fallback threshold to be implemented in the event of an erroneous reference time in the algorithm, e.g., for a subsequent event, in order to definitely not suppress this second airbag stage or other suitable passenger protection means at high crash severities.

Exemplary embodiments of the present invention are illustrated in the drawing and explained in greater detail in the following description.

DETAILED DESCRIPTION OF THE INVENTION

Figure 1:
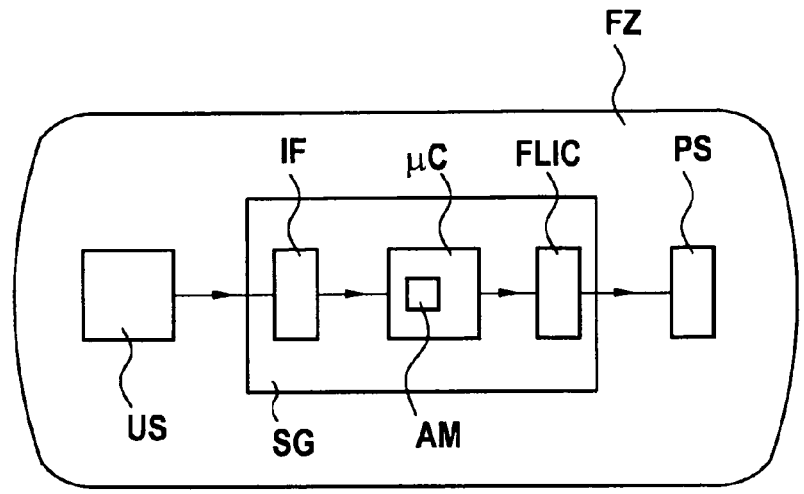
FIG. 1 shows a control device according to the present invention having connected components in a vehicle.

FIG. 1 illustrates in a block diagram a vehicle FZ, schematically illustrated, having a control device SG in accordance with the present invention, to which an accident sensor system US is connected, and passenger protection means PS. In the case at hand, only those components that are essential for understanding the present invention are illustrated. Other components that are required for operating the control device according to the present invention but that do not contribute to an understanding of the present invention have been omitted for the sake of simplicity. This includes, for example, the energy supply or a redundant evaluation path.

Control device SG obtains accident signals from accident sensor system US via interface IF, which may be part of a system ASIC in control device SG, for example. Accident sensor system US may be any type of accident sensor, in particular even combinations of such accident sensors, among them acceleration sensors in the vehicle sides, on the vehicle front, on the vehicle tunnel, ESP acceleration sensors that are designed for low accelerations, rotary motion sensors in all spatial directions, structure-borne noise sensor systems, air-pressure sensors to detect a side impact and the various types of environment sensor systems such as radar, lidar, and ultrasound. Video may also be included.

Data from this environment sensor system are preferably transmitted digitally, via point-to-point connections, for example, but sensor busses are also possible in the case at hand. A part of the sensor system may also be located in control device SG itself. In particular, structure-borne noise sensors, acceleration sensors for high and low acceleration, and also rotary motion sensors may be located in control device SG itself and may be queried at a higher query rate. However, in this instance the accident sensor systems are shown outside of control device SG by way of example.

Interface IF formats the received data into a format that is suitable for a transmission method in the control device. For example, for a transmission via the so-called SPI (serial peripheral interface bus). As an evaluation circuit, microcontroller μC then obtains these data from interface IF. Microcontroller μC supplies these accident signals to analysis module AM in particular, in order to determine the time marking using the constant fraction discrimination method, in order to derive the crash time since crash start therefrom. Prior to this analysis, the accident signal is already pre-processed, for example in accident sensor system US itself, or in interface IF, or in microcontroller μC. For example, this pre-processing includes a low-pass filtering, which may also be performed by software technology, i.e., digitally, and/or a filtering by limiting the signal rising edges, which is known as the so-called slew-rate limitation. Additional pre-processing is possible, for example, of different filterings in the frequency and time range.

Analysis module AM then performs the constant fraction discrimination method on the accident signal and thus determines the time marking from which the crash time may ultimately be derived. The crash time then determines, for example, whether it is a 26 km/h or 32 km/h frontal impact. In the event of a 32 km/h frontal impact, a triggering signal is generated by microcontroller μC and transmitted to triggering circuit FLIC, which may also be part of the system ASIC, as explained above.

As a function of this triggering signal, triggering circuit FLIC brings about the activation of specific passenger protection means, which are indexed by the triggering signal and possibly also the strength of the triggering. Temporal sequences may also be stored in the triggering signal.

This then results in a reliable and temporally optimized triggering of passenger protection means, in order to protect the vehicle occupants.

Figure 2:
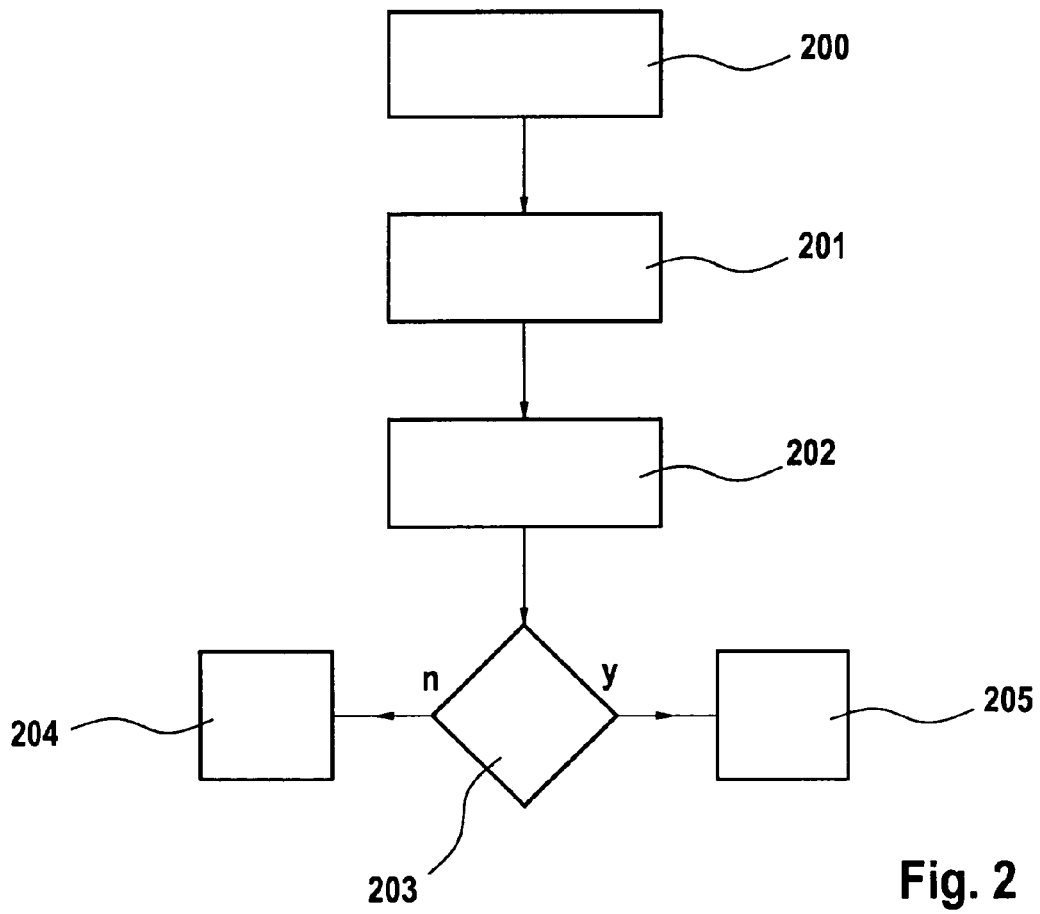
FIG. 2 shows a flow chart of the method according to the present invention.

FIG. 2 illustrates the method according to the present invention in a flow chart. In method step 200, the accident signal is provided by interface IF after it is received from accident sensor system US. It is preprocessed in method step 201, it being possible for the preprocessing to take place already in the accident sensor system or in interface IF or another interposed module or in microcontroller µC as the evaluation circuit. As indicated above, the preprocessing is usually a low-pass filtering. However, it may be a limitation of the rising edge or another signal preprocessing, for example, a band pass filtering.

Then, in method step 202, in analysis module AM, the constant fraction discrimination method is applied to the accident signal preprocessed in this manner. The crash time may thus be determined, and this crash time is checked in method step 203 to see whether or not a triggering case exists for passenger protection means PS. If this is not the case, then the method ends in method step 204. However, if this is the case, then the corresponding triggering of passenger protection means takes place in method step 205.

Figure 3:
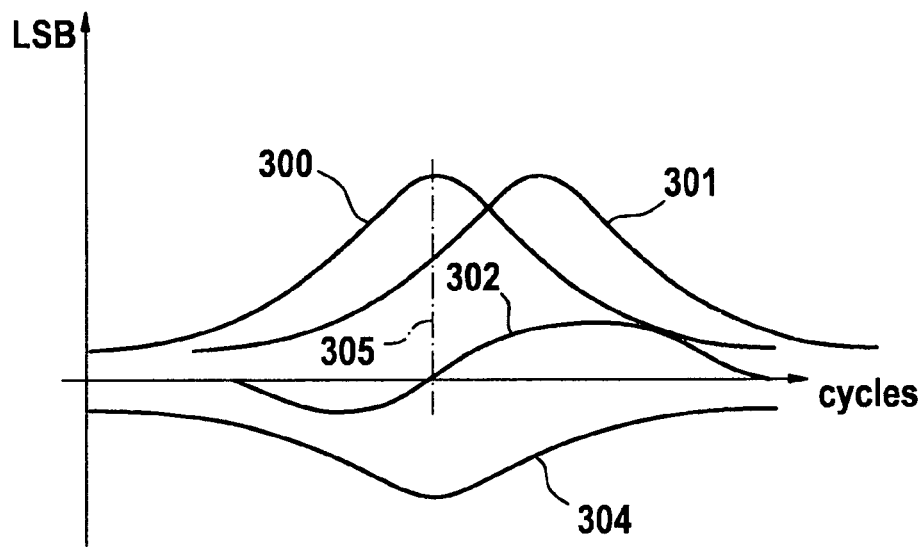
FIG. 3 shows an acceleration time chart.

FIG. 3 shows an acceleration time diagram in order to illustrate the different signals and the use of the constant fraction discrimination method. The acceleration signal, in the vehicle longitudinal direction, that is preprocessed by low-pass filtering, for example, serves as input signal 300, which signal was ascertained inside of control device SG by an acceleration sensor or a sensor system. The alternatives to this have already been listed above.

In two parallel paths, this input signal 300 is on the one hand temporally delayed, 301, with the aid of a time delay element. This delay is adjustable as an application parameter. It may also be adaptively adjusted during operation.

In the other subpath, the input signal is inverted and attenuated 304 by a factor <1. The attenuation factor may also be adjusted as an application parameter or adaptively.

Constant fraction discrimination signal 302 is formed by adding signals 301 and 304. The time point of the maximum in input signal 300 is detected with the aid of constant fraction discrimination signal 302, specifically at the moment when it has a positive zero crossing. This is illustrated by the dashed parallel to coordinate 305. It should be noted that the maximum and the zero crossing do not coincide precisely. At any rate, the time of the zero crossing remains nearly constant relative to the maximum and independent of the signal amplitude of the input signal.

The evaluation of the crash signals for different vehicle platforms shows that the peak to be detected occurs temporally earlier in the 32 km/h frontal impact than in a 26 km/h frontal impact, i.e., at a lower value of the algorithm timer as reference time for the crash start.

Figure 4:
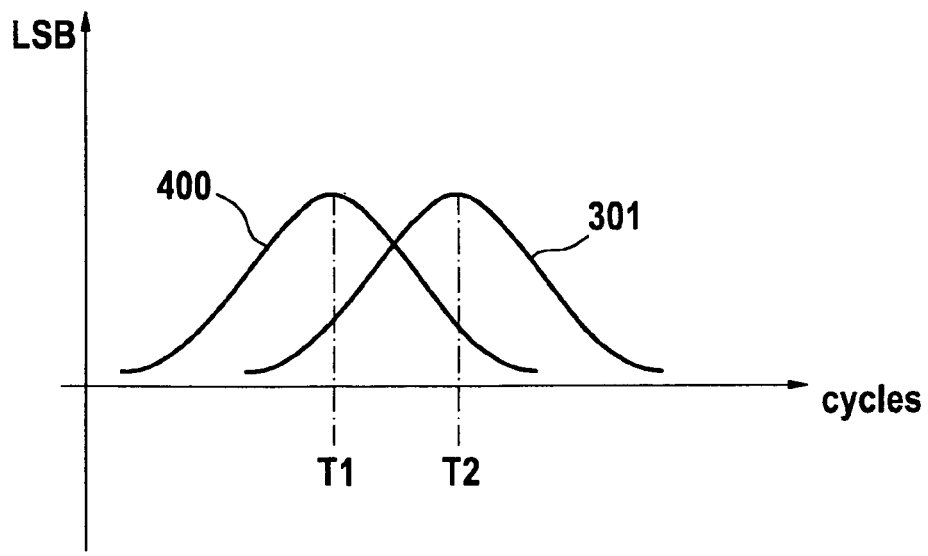
FIG. 4 shows an additional acceleration time chart.

FIG. 4 shows this in an additional acceleration time diagram. Curve 400 shows a 32 km/h frontal impact with its first maximum at time T1. On the other hand, curve 401 shows a 26 km/h frontal impact with a maximum T2, which occurs after time T1.

If the detected time of the maximum is within or outside of an applicable minimum-maximum interval, then the assignment of the respective accident types, to one of the two classes 26 km/h frontal crash or 32 km/h frontal crash, takes place.

Figure 5:
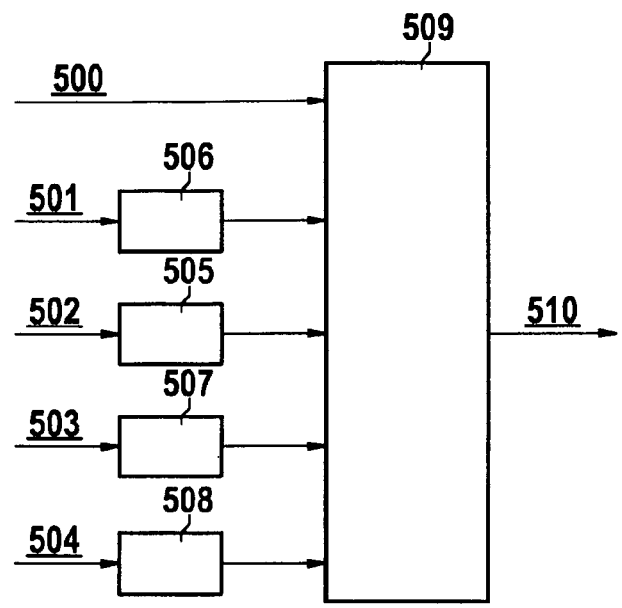
FIG. 5 shows a block diagram.

FIG. 5 shows a block diagram having different subpaths for the control device according to the present invention. Only when all subpaths 500 to 504 have a corresponding predetermined logical signal is a flag 510 set by AND gate 509, which brings about the triggering of the passenger protection means. This so-called low-risk flag 510, which is used in the triggering algorithm to suppress the second airbag stage, is satisfied only if all subpaths are satisfied.

Path 500 displays a logical 1 if the vehicle's own velocity is within an applicable velocity band.

Path 501 displays a logical 0 if the velocity reduction determined by integration from the acceleration signal in the vehicle longitudinal direction since the crash start is smaller than an applicable upper limit. This logical 0, or if this case has not occurred, the logical 1, is then inverted by inverter 506 before it goes to AND gate 509.

Path 502 excludes angle and offset crashes, so that it is a frontal crash, a so-called flat frontal crash, which causes the corresponding triggering. That is, if an offset or an angle is detected, then a logical 1 exists, which is inverted by inverter 505.

Path 503 is the analysis according to the present invention, which outputs a logical 1 if a 32 km/h frontal impact was detected. This is then inverted and accordingly results in the second airbag stage not being suppressed in low-risk flag 510. In path 504, a fallback level is provided, which has a time-independent fallback threshold, in order to definitely not suppress the second airbag stage at high crash thresholds. That is, if this threshold is exceeded, then a logical 1 exists. This is inverted in inverter 508 and then likewise has the result that the low-risk flag is not set, i.e., the second airbag stage is not suppressed.

Figure 6:
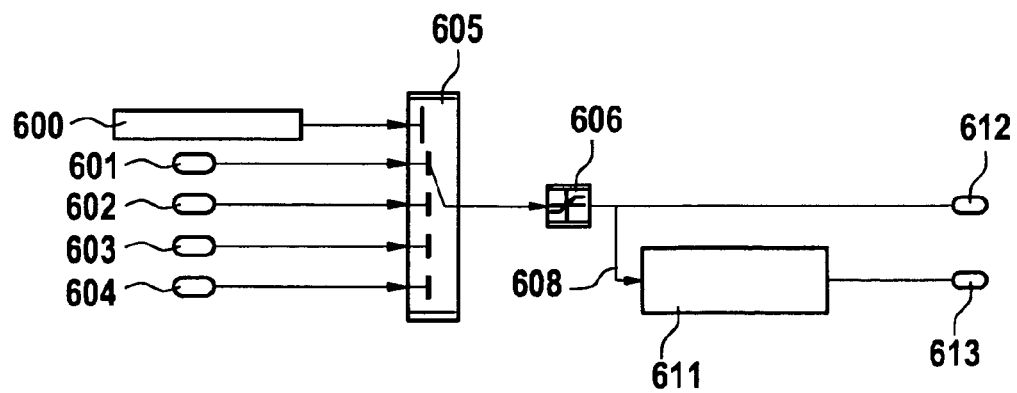
FIG. 6 shows an additional block diagram.

FIG. 6 illustrates another block diagram of the constant fraction method for analyzing the accident signal according to the present invention. The analysis according to the present invention searches for a characteristic maximum in the low-pass filtered acceleration signal of the acceleration sensor in the control device, for example, which measures in the vehicle longitudinal direction and checks whether the time of the maximum falls within an applicable time window. The raw signal of this acceleration is initially low-pass filtered, the frequency limit being applicable in this instance as well. Multiplexer 604 selects the corresponding signal from signal sources 600 to 604. Signal sources 600 to 604 are low-pass filtered acceleration signals of the acceleration sensor in the control device which respectively have a different frequency limit. For the purpose of simplification, it would be possible to replace 600-605 with a single block, preprocessing, which stands for low-pass/slew rate or another filtering. A subsequent signal limiting 606 limits the signal in the upward direction and in the downward direction (lower limit=0 for the suppression of negative portions of the signal). The low-pass-filtered and limited acceleration signal may then be provided to path 608 and to output 612.

In path 608, the signal delay takes place in block 611, so that time-delayed signal 613 then exists.

Figure 7:
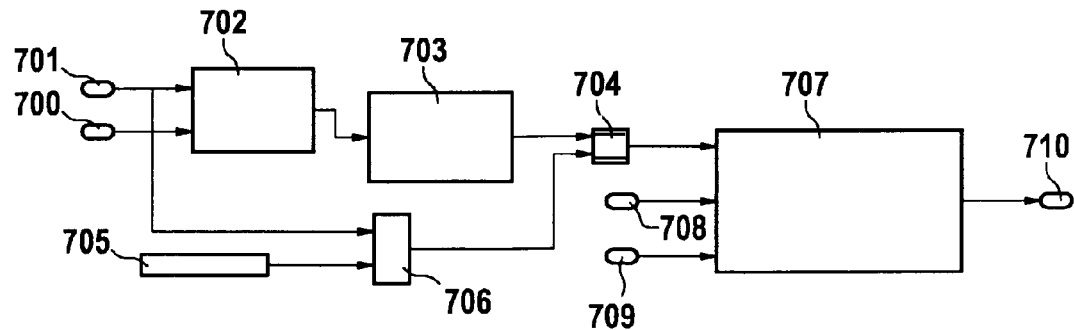
FIG. 7 shows an additional block diagram.

The further signal processing is illustrated in FIG. 7 in an additional block diagram. The low-pass filtered acceleration signal 701 and the time-delayed acceleration signal 700 are used. This then goes into block 702, which calculates the constant fraction discrimination signal. This is explained in more detail in FIG. 8. In threshold value comparator 706, acceleration signal 701 is compared to a threshold 705, in order to mask out undesired peaks in the acceleration signal.

In block 703, which obtains the constant fraction discrimination signal from block 702, this signal is subsequently checked with regard to a positive zero crossing. This is explained in more detail in FIG. 9. This zero crossing from block 703 is then provided to an AND gate 704, also entered by the output signal of threshold value comparator 706, which only releases the AND gate if threshold 705 was exceeded. The output signal of AND gate 704 then enters block 707, which determines the time marking, signals 708 and 709 additionally entering it. Signal 708 is the algorithm timer, which was started when the noise threshold was exceeded, for example. Signal 709 is the value of output signal 710, temporally delayed by one cycle, which corresponds to signal 503 illustrated in FIG. 5. This is the signal that outputs a logical 1 when a 32 km/h frontal impact has been detected.

Figure 8:
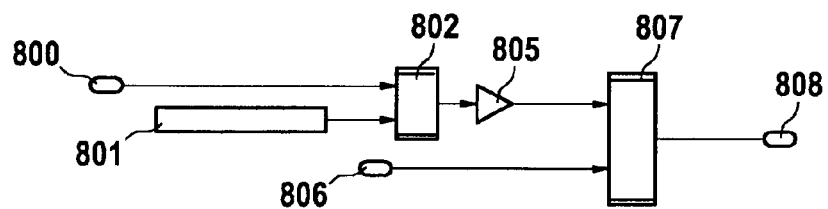
FIG. 8 shows an additional block diagram.

FIG. 8 illustrates in a block diagram the determination of the constant fraction discriminator signal. The low-pass filtered acceleration signal 800 goes to a multiplier 802 and is multiplied by an attenuation factor 801, this attenuation factor 801 being <1, so that an attenuation exists. This damped signal then enters an inverter 805, on the one hand, so that the inversion then exists.

The inverted signal after inverter 805 is then totaled with delayed acceleration signal 806 in summing unit 807. Then the sought after value 808 exists.

Figure 9:
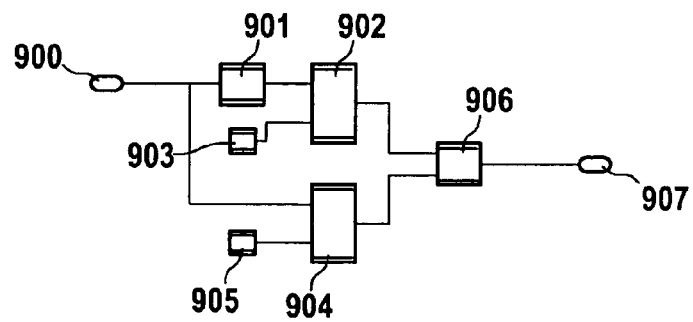
FIG. 9 shows an additional block diagram.

FIG. 9 explains block 703 in detail. Calculated constant fraction discriminator signal 900 enters a time-delay element 901 and a threshold value comparator 904. The comparison with the value 0 takes place in threshold value comparator 904. Time-delayed value 901 goes into threshold value comparator 902, where threshold value 0 is used to check whether the delayed threshold value is >0. The outputs of threshold values 902 and 904 go into AND gate 906. This achieves a situation in which a positive zero crossing is obtained exactly when signal 900 changes its sign from − to +.

Figure 10:
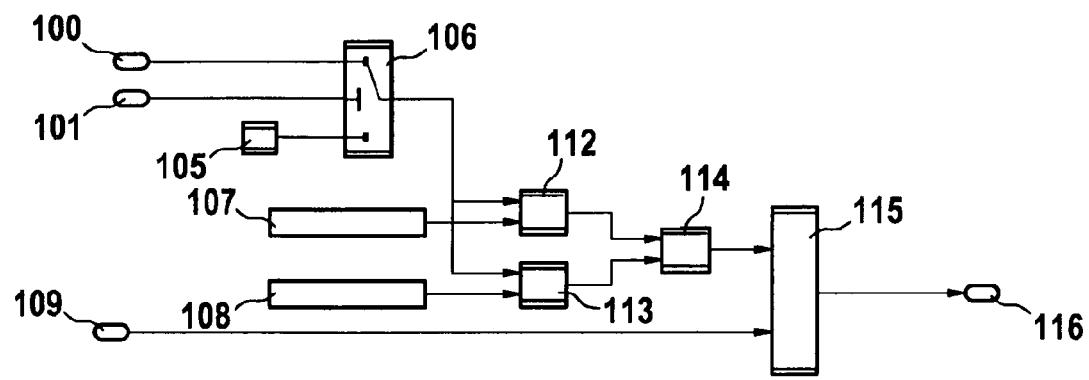
FIG. 10 shows an additional block diagram.

After a successful maximum detection, algorithm timer 708 is evaluated against applicable thresholds. This is explained in FIG. 10. Algorithm timer 100 is let through by switch 106 if the zero crossing detection signal 101 takes on a logical value 1, otherwise switch 106 provides constant output value 105=0. The output signal of switch 106 is checked against threshold 107 in threshold value decision element 112, and at the same time against threshold 108 in threshold value decision element 113. The output signals of these threshold value decision elements are linked to each other in AND gate 114, and the output signal of this AND gate 114 goes into OR gate 115. Furthermore, OR gate 115 takes signal 109 as a second input, which through temporal delay of signal 116 of OR gate 115 up to the next algorithm reset transition, at which signal 109 is reset to 0. For the sake of simplicity, the reset of signal 109 to 0 is not explicitly illustrated. Overall, output 116 of the OR gate specifies whether the current value of algorithm timer 100 falls within an applicable time range, defined by threshold values 107 and 108. If this is the case, flag 116 is always set to true, i.e., logical 1.

What is claimed is:

1. A computer-implemented method for triggering passenger protection means for a vehicle comprising:
    analyzing, by a computer processor, at least one accident signal that indicates that an accident has occurred, the analysis being performed using a constant fraction discrimination method to obtain an analysis of the at least one accident signal; and
    triggering, by the processor, a passenger protection means as a function of the analysis.

2. The method as recited in claim 1, wherein the constant fraction discrimination method is used to distinguish between a 26 km/h and a 32 km/h frontal impact, and the triggering is implemented only in the case of the 32 km/h frontal impact.

3. The method as recited in claim 2, wherein the triggering takes place as a function of the analysis in conjunction with at least one of: a check of the vehicle's own velocity and a crash type recognition.

4. The method as recited in claim 1, wherein for analyzing of the at least one accident signal, the at least one accident signal is divided into a first and a second component, the first component is delayed, and the second component is inverted and evaluated, and the components modified in this manner are added together, the first zero crossing having a positive first derivation being detected as a crash time, and wherein the triggering takes place as a function of this crash time.

5. The method as recited in claim 2, wherein for analyzing of the at least one accident signal, the at least one accident signal is divided into a first and a second component, the first component is delayed, and the second component is inverted and evaluated, and the components modified in this manner are added together, the first zero crossing having a positive first derivation being detected as a crash time, and wherein the triggering takes place as a function of this crash time.

6. The method as recited in claim 3, wherein for analyzing of the at least one accident signal, the at least one accident signal is divided into a first and a second component, the first component is delayed, and the second component is inverted and evaluated, and the components modified in this manner are added together, the first zero crossing having a positive first derivation being detected as a crash time, and wherein the triggering takes place as a function of this crash time.

7. The method as recited in claim 4, wherein the crash time is determined by a period of time between an exceeding of a noise threshold by the at least one accident signal and the first zero crossing.

8. The method as recited in claim 5, wherein the crash time is determined by a period of time between an exceeding of a noise threshold by the at least one accident signal and the first zero crossing.

9. The method as recited in claim 6, wherein the crash time is determined by a period of time between an exceeding of a noise threshold by the at least one accident signal and the first zero crossing.

10. The method as recited in claim 1, wherein the at least one accident signal is low-pass filtered or limited with regard to its rising edge prior to the analysis.

11. The method as recited in claim 2, wherein the at least one accident signal is low-pass filtered or limited with regard to its rising edge prior to the analysis.

12. The method as recited in claim 3, wherein the at least one accident signal is low-pass filtered or limited with regard to its rising edge prior to the analysis.

13. The method as recited in claim 4, wherein the at least one accident signal is low-pass filtered or limited with regard to its rising edge prior to the analysis.

14. The method as recited in claim 1, wherein the analysis is used to determine at least one of a crash type and a crash severity.

15. The method as recited in claim 1, wherein an acceleration signal or its first or second integral is used as the at least one accident signal.

16. The method as recited in claim 2, wherein an acceleration signal or its first or second integral is used as the at least one accident signal.

17. The method as recited in claim 3, wherein an acceleration signal or its first or second integral is used as the at least one accident signal.

18. The method as recited in claim 1, wherein for the at least one accident signal, a time-independent release threshold is used for a second airbag stage.

19. The method as recited in claim 2, wherein for the at least one accident signal, a time-independent release threshold is used for a second airbag stage.

20. A control device for triggering a passenger protection means for a vehicle comprising:
- an interface that provides at least one accident signal that indicates that an accident has occurred;
- an evaluation circuit with an analysis module that generates a triggering signal as a function of an analysis of the at least one accident signal via a constant fraction discrimination method; and
- a triggering circuit that triggers the passenger protection means a function of the triggering signal.

* * * * *

UNITED STATES PATENT AND TRADEMARK OFFICE
CERTIFICATE OF CORRECTION

PATENT NO. : 8,527,150 B2
APPLICATION NO. : 12/735332
DATED : September 3, 2013
INVENTOR(S) : Wieland et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this
Fifteenth Day of September, 2015

Michelle K. Lee
*Director of the United States Patent and Trademark Office*